(No Model.)

J. W. WEISER.
WAGON WHEEL.

No. 325,137. Patented Aug. 25, 1885.

Witnesses:-
Louis M. Whitehead.
C. C. Poole

Inventor:-
John W. Weiser.
by:-
M. E. Dayton
Attorney.

N. PETERS, Photo-Lithographer, Washington, D. C.

UNITED STATES PATENT OFFICE.

JOHN W. WEISER, OF CHICAGO, ILLINOIS.

WAGON-WHEEL.

SPECIFICATION forming part of Letters Patent No. 325,137, dated August 25, 1885.

Application filed March 5, 1885. (No model.)

*To all whom it may concern:*

Be it known that I, JOHN W. WEISER, of Chicago, in the county of Cook and State of Illinois, have invented certain new and useful Improvements in Wagon-Wheels; and I do hereby declare that the following is a full, clear, and exact description thereof, reference being had to the accompanying drawings, and to the letters of reference marked thereon, which form a part of this specification.

The object of this invention is to provide an improved construction in wheel-hubs and parts relating thereto, in several particulars, as will be hereinafter pointed out; and it consists in the matters hereinafter set forth, and pointed out in the claims.

The invention may be more fully understood by reference to the accompanying drawings, in which—

Figure 1:
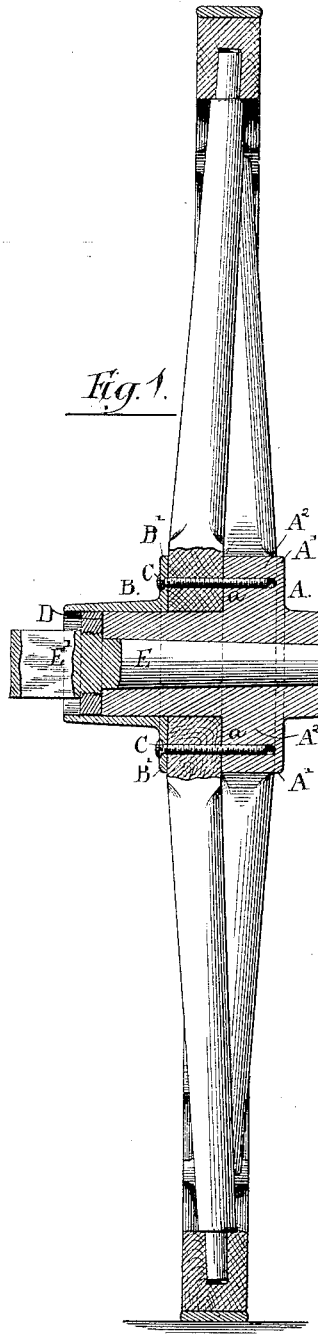
Figure 3:
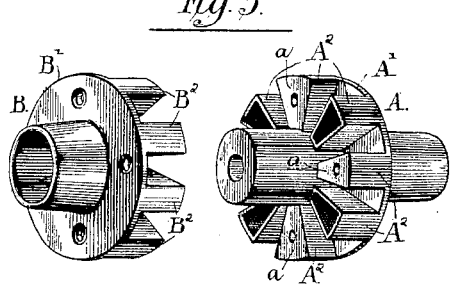
Figure 2:
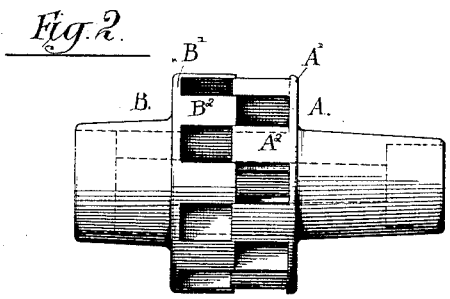
Figure 4:
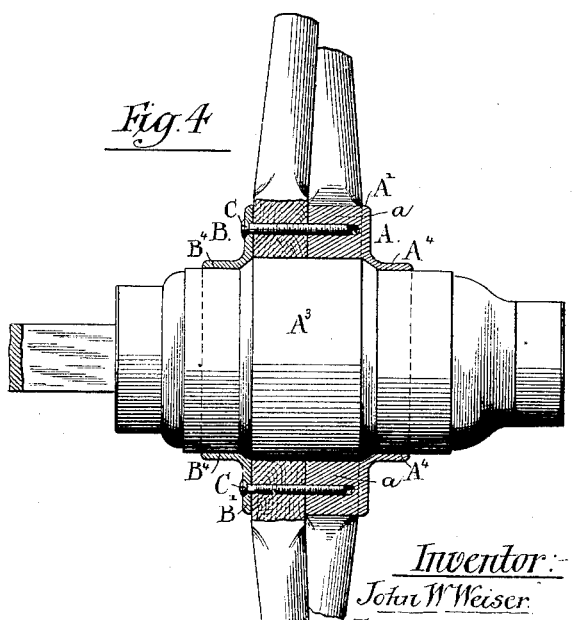

Figure 1 is a diametric section through a wheel embodying the features of my invention, the axle being shown partly in elevation. Fig. 2 represents the hub. Fig. 3 shows the two parts of the hub separated. Fig. 4 represents a modification of the hub.

The first three figures of the drawings represent the principal component parts of the hub as consisting of two sections, A and B, of which the section A provides the main body portion of the hub and a suitable bearing for the axle. Said section A is, in effect, a comparatively long hub or cylindric body, hollowed out from end to end to receive the journal of the axle, while the section B is in the nature of a sleeve fitted upon one end portion of the section mentioned.

The section A is provided at a point intermediate of its ends with an annular flange, A', and an annular series of radial projections, A², formed at and uniting with one side of the flange. These projections, which are radial to the axis of the body-section A and lateral to the flange thereon, extend out to the periphery of the flange, and are formed at suitable intervals to provide an annular series of notches or partial spoke-sockets, in each of which the flange and the opposing sides of two adjacent projections serve to form three side walls.

The section B, which consists of a sleeve adapted to fit upon one end portion of the body-section A, is provided at one end with an annular flange, B', which is also provided upon one side with an annular series of lateral projections, B², similar in construction and disposition to the projections of the other section of the hub.

These two sections are fitted together with the projections of each section opposite the recesses or spaces between the projections of the other section, and as a means for preventing one section from turning independently of the other the projections on each section are fitted a short way into the recesses or spaces of the opposing section, thereby interlocking together the two sections and at the same time completing the spoke-sockets, for which latter purpose the ends of the projections A² provide the fourth sides for the sockets of the section B, while the ends of the projections B² of the said section B serve in turn as the fourth walls for the sockets for the section A. In this way the hub is provided with two annular series of spoke-sockets, alternating from one to the other of two annular lines with reference to their progressive situations. The two sections are secured together at intervals by bolts or screws C, to provide substantial bearings for which several of the projections upon one of the sections are made solid, as at $a$, Fig. 3, the remaining projections being made hollow in order to provide a light construction of hub. In the illustration the screw-bolts pass through flange B' of one section and enter the solid projections $a$ of the opposing section, the screw-bolts in such instance passing through some of the spokes that are fitted in the sockets of the section B; but the screw-bolts can just as well be inserted through the flange of section A, in which case the solid sections will be present in the other section.

In place of screws, bolts and nuts can be employed, which may pass through both flanges; but the preferred way is to provide fastening devices which, when applied, will not be visible at the outer side of the wheel, for which reason, where screws are employed, they will be arranged with their heads countersunk in the flange B'.

The foregoing construction admits of each section with its flange and projections thereon being cast in one piece. In Fig. 4, however, the feature of the flanges and lateral projections is shown applied to a wooden hub-body, A³, the flanges A' and B' being, however, each formed of metal and each provided with an annular series of projections. In such instance the flanges A' and B' will be respectively formed upon base-rings A⁴ and B⁴, which are fitted upon the wooden hub-body, which serves as a bottom for the spoke-sockets of both series. In the preceding figures the section A likewise provides a bottom for the spoke-sockets, the principal difference in the two constructions being that in the one the flange A' is integral with the body-section, while in the other it is made separate therefrom, thus leaving it optional to make the hub entirely of metal, or of part wood and part metal, as may be desired.

In either of the two constructions of hub herein shown, the inner ends of the spokes are alternately secured in one and the other of two hub-sections which are adjustable in a direction coincident with the axis of the hub. This feature permits the spokes to be connected with the hub-sections at a time when the latter are a sufficient distance apart to permit the outer ends of the spokes to be inserted into or placed coincident with sockets in the rim of the wheel, whereby after such preliminary operation has been performed the two hub-sections can be drawn or forced together, so as to bring the spokes more nearly perpendicular to the axis of the hub and into their ultimate position in the wheel, thus forcing the outer ends of the spokes into the rim and tightening up the wheel. In this way the rim can be made entire preparatory to fitting the spokes therein, and the inner ends of the spokes can be adapted in thickness to permit the spokes to be moved outwardly or righted to a sufficient extent to tighten them in the wheel. The spokes may be readily dressed or reduced in thickness at their inner ends, so that in placing the parts of the wheel together the notched flanges may be brought together sufficiently to hold the spokes tight in the wheel.

The sleeve or collar B preferably extends back of what will be the inner end of the central or body section, A, of the hub, so as to form a sand-band, which surrounds an annular shoulder, D, formed by a nut which is fitted upon the axle E at the joint where the journal portion E' thereof commences. This nut constitutes a shoulder against which the inner end of the body-section A abuts, and is made of steel so as to avoid rapid wear.

The outer end of the body-section of the hub is provided with a recess into which a nut, F, is fitted and adapted to turn. This nut is screwed upon a threaded neck, E², extending from the end of the journal into the recess of the hub, and serves to retain the wheel upon the journal. The journal is shouldered at the junction of its smooth bearing portion and its threaded neck, which shoulder is flush with or a little beyond the inner end wall of the socket in the hub.

As a means to compensate for the wear of the inner face of this nut, it is centrally recessed at its inner side and a series of thin washers, G, fitted within said recess. The threaded end or neck of the journal passes through these washers, so as to permit them as a body to be forced and held against the shoulder on the journal when the nut is tightened up. As the nut becomes worn, it can be taken off and one or more washers taken out, thus permitting the nut to be screwed still farther up upon the journal, and so as to maintain the inner face of the nut against the hub at the inner end of the recess in the latter.

The washers may, if preferred, be made of split flat spring-rings, adapted to spring outwardly against the wall of the recess in the nut, which construction and arrangement will cause the washers to turn with the nut when the latter is unscrewed from the journal, and also prevent the washers from dropping out after the nut has been taken off.

I am aware that it has been proposed heretofore to make a wheel-hub with two annular parts or flanges, each provided with lateral segmental projections adapted together to form two annular series of spoke-sockets; and I do not, therefore, broadly claim such construction. In hubs of this kind as heretofore constructed however, the annular parts have been held in the desired relative position by means of a threaded sleeve surrounding the axle and engaging one of the said annular parts, thus making necessary a complicated and expensive construction in order to enable the sleeve to be turned with reference to the flanges for tightening the latter against the spokes. In the construction herein shown one flange is constructed to slide longitudinally upon a tubular part or hub-section connected with the other flange, and the flanges are held together by means of bolts engaged with the flanges. By this means an exceedingly simple and economical construction in the parts is obtained, and I am enabled to advantageously apply said flanges to a wooden hub, as in the form of the device shown in Fig. 4.

What I claim is—

The hub-section A, having an annular flange provided with a series of lateral projections, A², combined with the part B, fitted to slide longitudinally upon the part A, and having a series of lateral projections, B², said projections and the spaces between them being of equal width circumferentially, and the projections in one part being arranged opposite the spaces between the projections in the other part, so as to form a double series of spoke-sockets and bolts secured in the flange of the part A, and in the part B operating to clamp the ends of the spokes in the sockets, substantially as described.

In testimony that I claim the foregoing as my invention I affix my signature in presence of two witnesses.

JOHN WM. WEISER.

Witnesses:
C. CLARENCE POOLE,
OLIVER E. PAGIN.